(12) United States Patent
Chapman et al.

(10) Patent No.: US 10,475,247 B1
(45) Date of Patent: Nov. 12, 2019

(54) CONFIGURATION FOR RESUMING/SUPPLEMENTING AN AUGMENTED REALITY EXPERIENCE

(71) Applicant: Disney Enterprises, Inc., Burbank, CA (US)

(72) Inventors: Steven Chapman, Thousand Oaks, CA (US); Joseph Popp, Cerritos, CA (US); Mehul Patel, Stevenson Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1 day.

(21) Appl. No.: 15/988,789

(22) Filed: May 24, 2018

(51) Int. Cl.
*G06T 19/00* (2011.01)
*H04L 29/08* (2006.01)

(52) U.S. Cl.
CPC ............ *G06T 19/006* (2013.01); *H04L 67/10* (2013.01)

(58) Field of Classification Search
CPC .................................................... G06T 19/006
See application file for complete search history.

(56) References Cited

U.S. PATENT DOCUMENTS

| 9,983,684 | B2* | 5/2018 | Wang | G06F 3/017 |
| 10,078,917 | B1* | 9/2018 | Gaeta | G06F 3/012 |
| 2015/0062163 | A1* | 3/2015 | Lee | G09G 3/003 |
| | | | | 345/633 |
| 2015/0109329 | A1* | 4/2015 | Park | G06T 11/00 |
| | | | | 345/629 |

* cited by examiner

*Primary Examiner* — Ryan R Yang
(74) *Attorney, Agent, or Firm* — Patent Ingenuity, P.C.; Samuel K. Simpson

(57) ABSTRACT

A process determines, with a content presentation device, a recognition indicium that corresponds to an identifier of the content presentation device. Further, the process provides, with the content presentation device, the recognition indicium to an output device so that the output device emits the recognition indicium. In addition, the process receives, at the content presentation device from the server, remaining content of an augmented reality experience that was paused by a processor in operable communication with an augmented reality device. The augmented reality device is distinct from the output device. Further, the processor sends the identifier and a position of the remaining content to the server. In addition, the process sends, with the content presentation device, the remaining content to the output device so that the output device emits the remaining content.

20 Claims, 8 Drawing Sheets

CONFIGURATION FOR RESUMING/SUPPLEMENTING AN AUGMENTED REALITY EXPERIENCE

BACKGROUND

1. Field

This disclosure generally relates to the field of augmented reality ("AR") experiences.

2. General Background

AR devices typically include a display that overlays a virtual experience above, beneath, and/or in conjunction with a real-world experience. For example, a conventional AR device may be a pair of AR glasses that displays an overlay of various text, images, etc. over a real-world object, person, place, etc. A user of the AR glasses may then view the real-world experience in conjunction with an augmented virtual experience. Yet, such conventional AR configurations are limited in that they only provide the AR experience to a user that is actively using the AR device, which may lead to user fatigue, loss of user interest, etc. over an extended period of time.

SUMMARY

In one aspect, a computer program product comprises a non-transitory computer readable storage device having a computer readable program stored thereon. The computer readable program when executed on a computer causes the computer to determine, with a content presentation device, a recognition indicium that corresponds to an identifier of the content presentation device. Further, the computer is caused to provide, with the content presentation device, the recognition indicium to an output device so that the output device emits the recognition indicium. In addition, the computer is caused to receive, at the content presentation device from the server, remaining content of an AR experience that was paused by a processor in operable communication with an AR device. The AR device is distinct from the output device. Further, the processor sends the identifier and a position of the remaining content to the server. In addition, the computer is caused to send, with the content presentation device, the remaining content to the output device so that the output device emits the remaining content.

In another aspect, the computer readable program when executed on a computer causes the computer to determine, with a content presentation device, a recognition indicium that corresponds to an identifier of the content presentation device. The computer is also caused to provide, with the content presentation device, the recognition indicium to an output device so that the output device emits the recognition indicium. Further, the computer is caused to receive, at the content presentation device from the server, supplemental content associated with an AR experience that is concurrently emitted by a processor in operable communication with an AR device. The AR device is distinct from the output device. The processor sends the identifier and a request for the supplemental content to the server. In addition, the computer is caused to send, with the processor, the supplemental content to the output device so that the output device emits the supplemental content.

In another aspect, an apparatus has a processor that performs the functionality of the computer readable program. In yet another aspect, a process performs such functionality.

BRIEF DESCRIPTION OF THE DRAWINGS

The above-mentioned features of the present disclosure will become more apparent with reference to the following description taken in conjunction with the accompanying drawings, wherein like reference numerals denote like elements and in which.

DETAILED DESCRIPTION

A configuration is provided to resume content playback or supplement an AR experience with additional content after the AR experience is interrupted. Examples of an AR experience interruption include, but are not limited to, removal of AR glasses from the head of a user, lowering of an AR-capable mobile computing device (e.g., tablet device, smartphone, smart watch, smart wearables, etc.), a hand gesture associated with a pause command, etc. In one aspect, one or more sensors (e.g., accelerometer, gyroscope, image capture device, etc.) may be used to determine when an AR experience is interrupted. The configuration uses the capabilities of multiple devices (e.g., an AR device and a display device) to allow for presentation of continuous and/or supplemental content.

Figure 1:
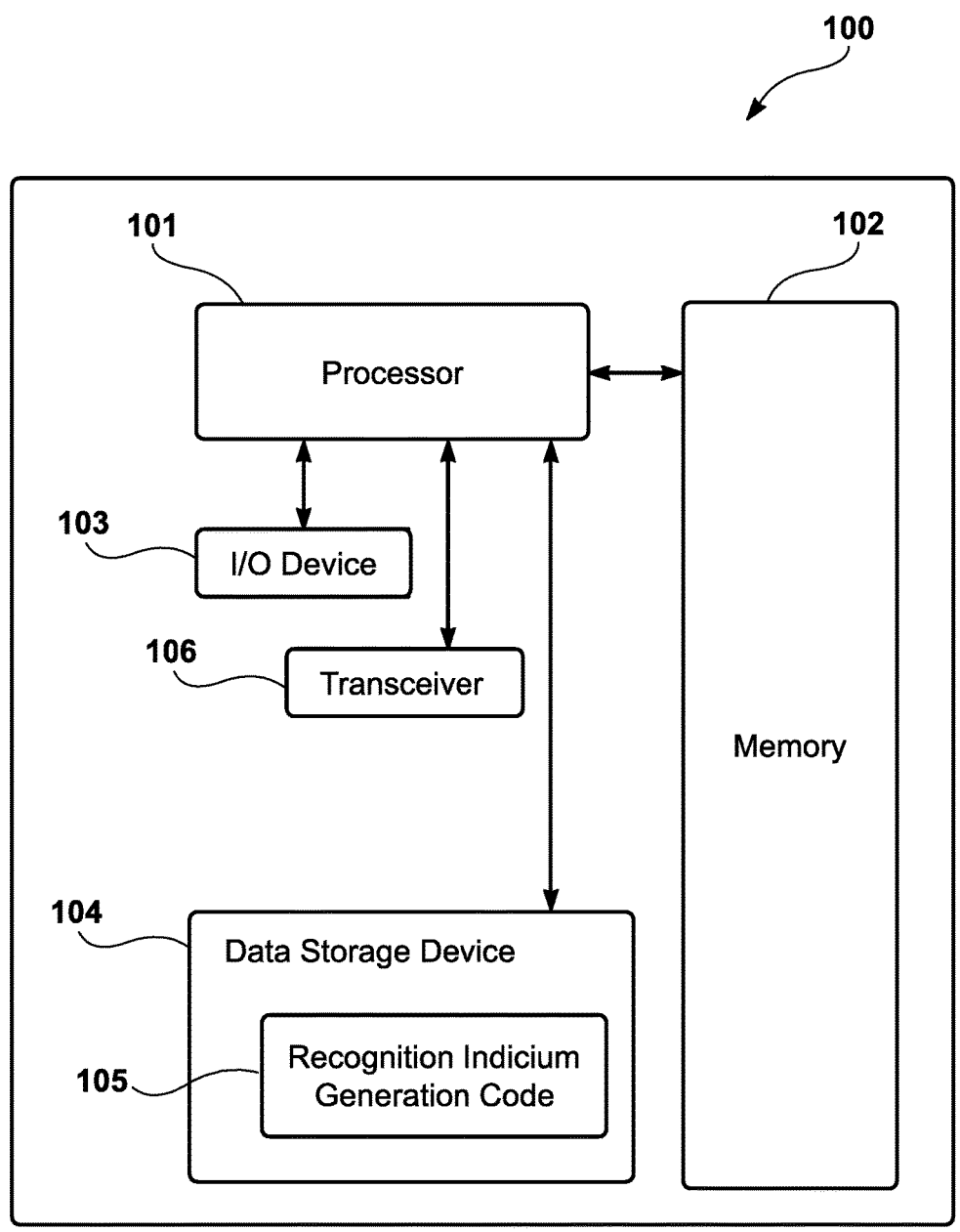
FIG. 1 illustrates the internal components of a content presentation device.

FIG. 1 illustrates the internal components of a content presentation device 100. Further, the content presentation device 100 (e.g., a desk computer, a laptop, streaming device, set-top box, DVD player, etc.) may be capable of receiving content or generating content and forwarding that content to an output device (e.g., television, radio, audio speakers, etc.) for presentation of the content. For instance, the content presentation device 100 may receive the content from one or more sources (e.g., a server, non-transitory computer readable medium, etc.).

Further, the content presentation device 100 includes a processor 101, a memory 102 (e.g., random access memory ("RAM") and/or read only memory ("ROM")), one or more input/output ("I/O") devices 103, a transceiver 106, and a data storage device 104. The one or more I/O devices 103 (e.g., smart glasses, hand controller, headset, smartphone, tablet device, wearable device, keyboard, mouse, joystick, camera, biometric sensor, etc.) may be used to determine that the user has interrupted rendering of an AR experience.

The data storage device 104 includes recognition indicium generation code 105 to generate a recognition indicium (e.g., one-dimensional pattern, two-dimensional pattern, etc.) for presentation, via video and/or audio, at an output device (e.g., television) that operates independently of the AR device. The recognition indicium may include an identifier of the content presentation device (e.g., an internet protocol ("IP") address stored by the recognition indicium). Further, the AR device, and/or a computing device in operable communication with the AR device, is capable of receiving the recognition indicium and providing remaining and/or supplemental content, or a position in the remaining and/or supplemental content at which the AR experience was paused, to a server (remote or local) along with the identifier.

As an example, a user may move from room to room that each has a different content presentation device. An output device (e.g., television) in each room may display a different recognition indicium corresponding to an identifier for the particular content presentation device for that room. After an AR experience pause operation performed by the AR device, the position of the pause in the AR experience may be sent to the server (remote or local) along with the content presentation device identifier. The server then knows to which content presentation device (e.g., which room) to send the position of content resumption (without or without the corresponding content) and/or supplemental content.

Figure 2:
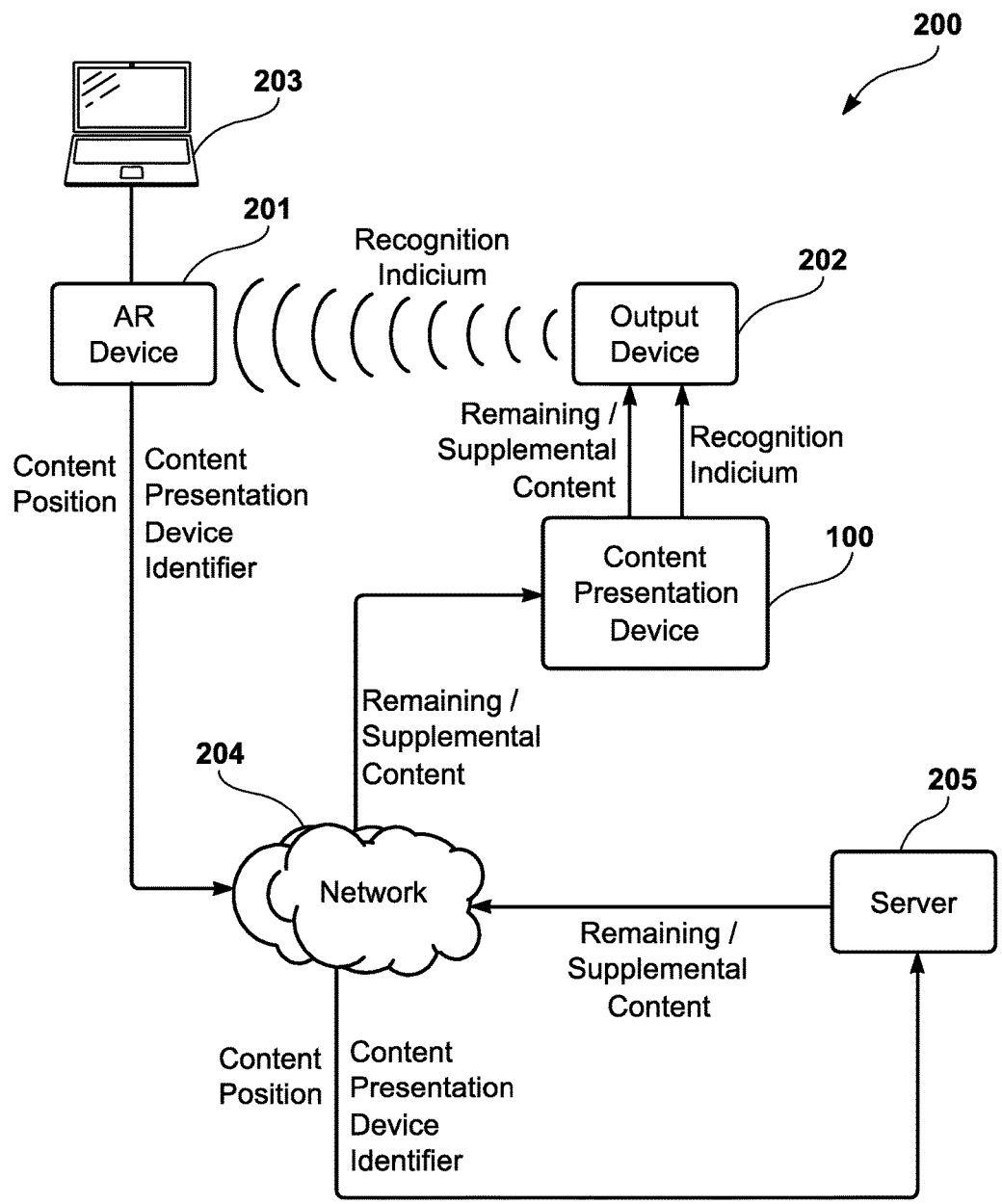
FIG. 2 illustrates a content system that uses the content presentation device illustrated in FIG. 1 to resume/supplement an AR experience that has been paused.

FIG. 2 illustrates a content system 200 that uses the content presentation device 100 illustrated in FIG. 1 to resume/supplement an AR experience that has been paused. For instance, the content system 200 has an output device 202 (e.g., television, gaming console, smartwatch, etc.) that is in operable communication with the content presentation device 100 (e.g., via cable connection, wireless connection, integration, etc.). For example, the content presentation device 100 may be a streaming device that receives streamed content or generates content and outputs the streamed content at the output device 202.

Prior to, during, or after an AR device 201 provides an AR experience (independently or in conjunction with a computing device 203 (e.g., laptop, desktop computer, etc.)), the content presentation device 100 obtains the recognition indicium from a server 205 through a network 204. Alternatively, the content presentation device 100 locally generates the recognition indicium with the processor 101 illustrated in FIG. 1 and registers itself with the server 205 so that the server is able to identify the content presentation device 100 via the recognition indicium. Subsequent to obtaining, or generating, the recognition indicium, the content presentation device 100 provides the recognition indicium to the output device 202.

In one aspect, a sensor (e.g., accelerometer, gyroscope, etc.) integrated within, or in operable communication with, the AR device 201 senses that the AR device 201 has been moved to a position in which the AR experience provided by the AR device 201 should be paused. As a result, a processor integrated within, or in operable communication with (e.g., via computing device 203), the AR device 201 pauses the AR experience provided by the AR device 201 and/or the computing device 203. Further, the processor integrated within, or in operable communication with, the AR device 201 receives the recognition indicium emitted by the output device 202; that processor may then decode the recognition indicium to determine a content presentation device identifier (e.g., IP address) to which the remaining content in the AR experience, or supplemental content (e.g., movies, audio, and/or social interaction scenarios intended to tie-in to the AR experience), should be sent from the server 205. The AR device and/or the computing device 203 then provide the content presentation device identifier and the position of the content pause to the server 205 so that the server 205 may send remaining/supplemental content to the content presentation device 100 for content resumption/supplementation. Alternatively, the content presentation device 100 may already have the remaining supplemental content. In that instance, the server 205 may send only an instruction to the content presentation device 100 to resume content at a particular position in the pre-stored content.

For example, as illustrated in FIGS. 3A-3D, a television 202, in proximity to a pair of smart glasses 201, may display a recognition indicium 302 (e.g., coded pattern that has an IP address of the content presentation device 100 that streams movie content from the remotely-located server 205). Such display of the coded pattern may occur during the AR experience. When a user removes the smart glasses 201, the smart glasses 201 and/or the computing device 203 (FIG. 2) pause the AR experience and send the content presentation device identifier along with the position of the pause in the content (e.g., thirty seconds after the start of the AR experience) to the remotely-located server 205. The television 202 then displays the remaining AR content and/or supplemental content. As a result, the user is able to continue consuming the AR experience, and/or related content, even after the user has removed, or lowered, the AR device 201 to avoid fatigue and/or obtain environmental awareness.

Figure 3A:
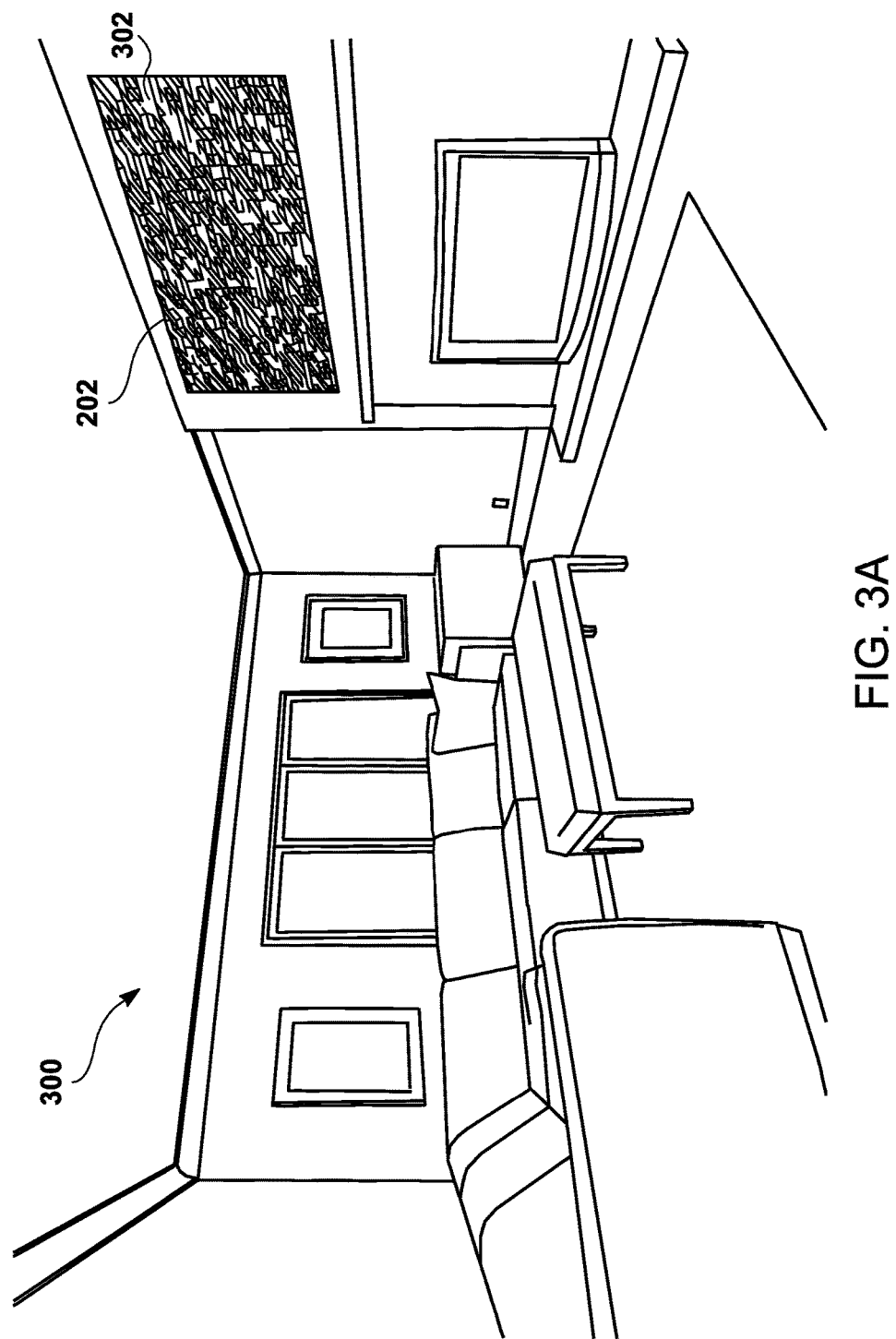
FIG. 3A illustrates an example of a physical environment in which the output device illustrated in FIG. 2 may be situated.
Figure 3B:
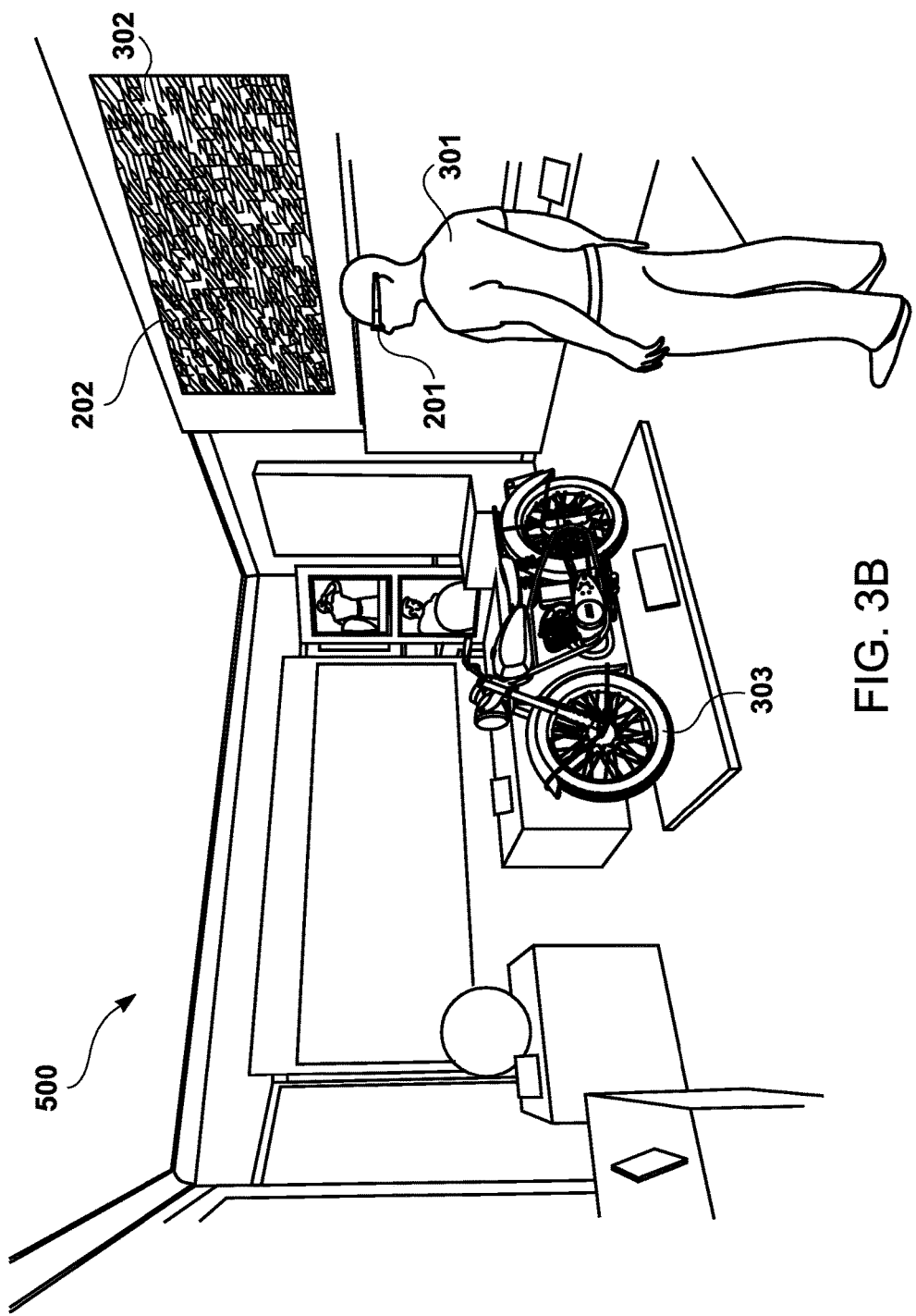
FIG. 3B illustrates an AR overlay environment in which an augmented virtual environment is overlaid over the physical environment illustrated in FIG. 2.

The recognition indicium 302 described herein and illustrated in FIGS. 3A and 3B is not limited to a specific method of pattern or image encoding. For example, the recognition indicium 302 may be composed from a variety of image or pattern types (e.g., barcodes, specifically assigned address images, etc.).

In one aspect, the AR device 201 and/or the computing device 203 have stored thereon an application for recognizing the recognition indicium. Further, the application may be configured to instruct the AR device 201 and/or the computing device 203 to send a position in the content at which rendering of the AR experience was paused, or the remaining content itself, to the content presentation device 100 upon pausing of the AR experience and prior, concurrent, or subsequent to detection of the recognition indicium 302. Further, the functioning of a computer (such as the AR device 201, the computing device 203, the content presentation device 100, and/or the server 205) is improved as memory requirements are reduced. For instance, the memory requirements associated with the AR device 201 and/or the computing device 203 are reduced as a memory associated with the AR device 201 and/or the computing device 203 will mostly be responsible for temporarily storing only a portion of the AR experience because the remainder will be executed by the processor 101 illustrated in FIG. 1, which is in the content presentation device 100.

FIG. 3A illustrates an example of a physical environment 300 in which the output device 202 illustrated in FIG. 2 may be situated. The recognition indicium 302 (e.g., coded pattern) may be displayed by the output device 202.

Further, FIG. 3B illustrates an AR overlay environment 500 in which an augmented virtual environment is overlaid over the physical environment 300 illustrated in FIG. 2. In other words, virtual imagery overlays the physical environment 300 illustrated in FIG. 3A. A user 301 may use an AR device 201 (e.g., smart glasses) to obtain an AR experience. During the AR experience, a television 202 may display the recognition indicium (e.g., two-dimensional coded pattern) generated by a content presentation device 100 (FIG. 2) in operable communication with the television 202.

Depicted from the perspective of the user 301, the AR environment 500 illustrates various images with which the user 301 may interact (e.g., via virtual touch). For instance, the user 301 may want to touch the virtual image 303 associated with a virtual motorcycle. Various sensors, built-in, or external, to the AR device 201 may detect the virtual touch gesture or other virtual user input.

Figure 3C:
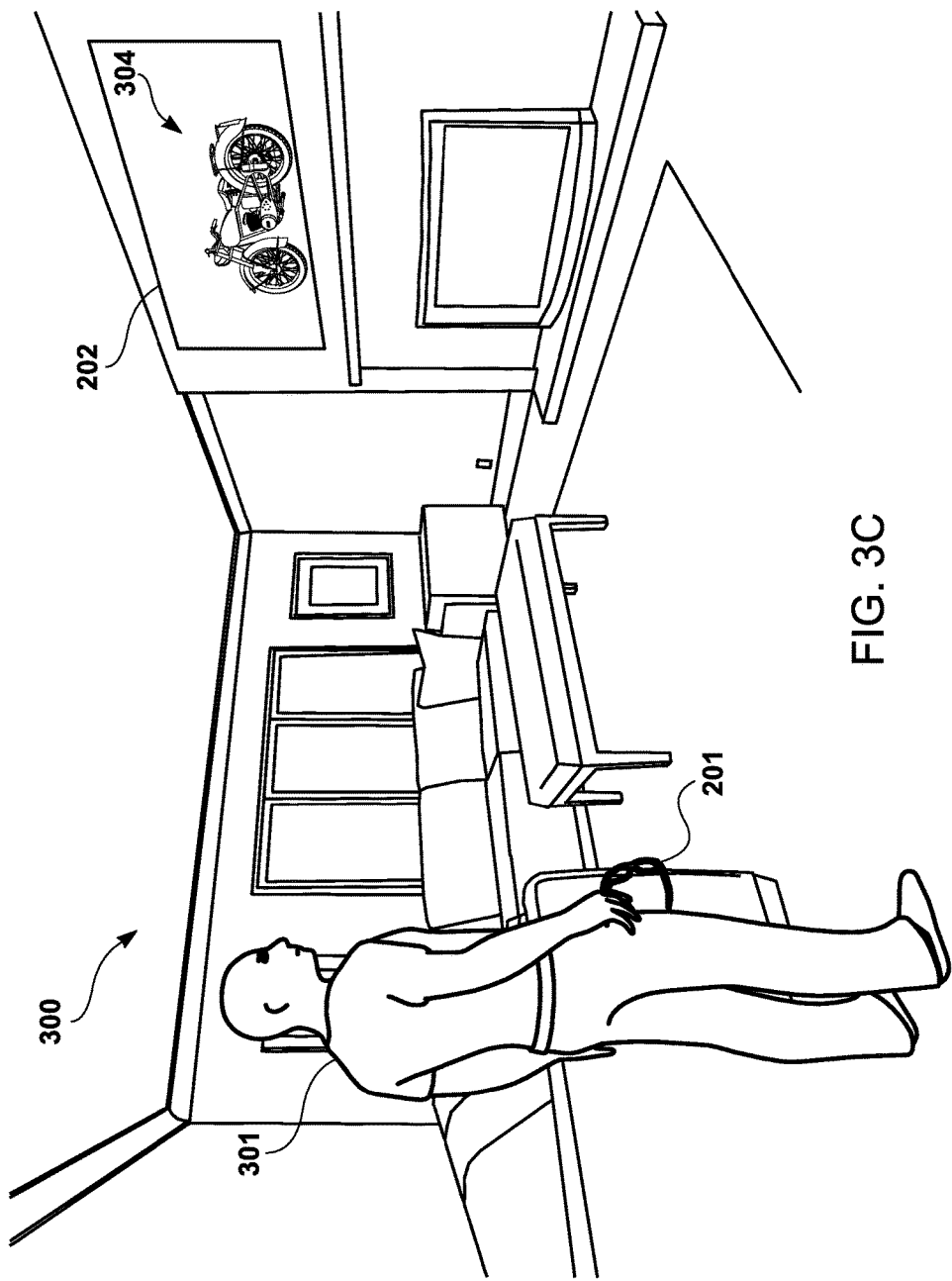
FIG. 3C illustrates the AR overlay environment illustrated in FIG. 3A after the user pauses the AR experience illustrated in FIG. 3B.

FIG. 3C illustrates the AR overlay environment 300 illustrated in FIG. 3A after the user 301 pauses the AR experience illustrated in FIG. 3B. For example, the user 301 may remove the smart glasses 201 to pause the AR experience; thereby resulting in the overlay environment 500 illustrated in FIG. 3B disappearing from the overlay environment 300. The pause of the AR experience may be detected by one or more sensors built-in, or external, to the smart glasses 201. Subsequent to the detection of the pause, the smart glasses 201 may send imagery 304, or an indication that imagery 304 should be displayed, through the network 204 (FIG. 2) to the remotely located, or local, server 205 so that the content presentation device 100 provides the imagery 304 to the output device 202 for display. The imagery 304 may be a continuation of the AR experience previously displayed in the AR overlay environment 500. For example, the imagery 304 may include the virtual image 303 of the motorcycle that was previously displayed within the AR overlay environment 500 when the user 301 was wearing the smart glasses 201. Accordingly, the user 301 is able to continue consumption of the AR experience, even if fatigued from wearing the smart glasses 201.

In one aspect, the imagery 304 is displayed on the television 202 from the same perspective as the user 301. For instance, the AR device 201 may send data indicative of the perspective of the user with respect to the AR overlay environment 500 and/or the physical environment 300 (e.g., three-dimensional coordinates). As a result, the user 301 may be able to view the AR overlay environment 500 and/or the physical environment 300 on the television 202 from the same perspective as when the user 301 was wearing the smart glasses 201.

Figure 3D:
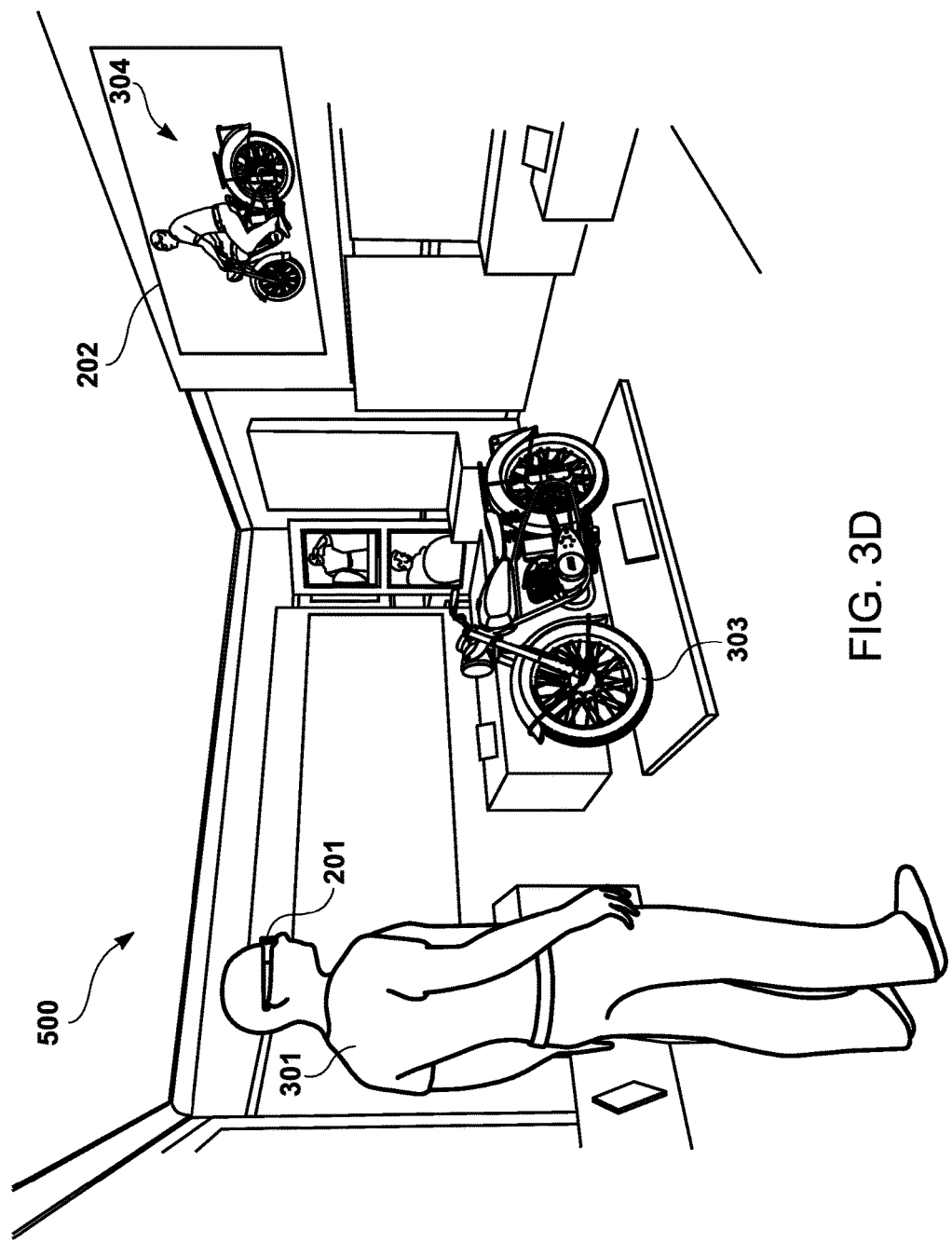
FIG. 3D illustrates the AR overlay environment illustrated in FIG. 3B in which the user views supplemental content on the output device without a pause in the AR experience.

In another aspect, the user 301 is able to concurrently view supplemental content in the AR overlay environment 500 illustrated in FIG. 3B. FIG. 3D illustrates the AR overlay environment 500 illustrated in FIG. 3B in which the user 301 views supplemental content on the output device 202 without a pause in the AR experience.

As a result, a processor associated with the AR device 201 may retrieve supplemental content to be sent to the television 202. In other words, the television 202 may be used not only during an interruption of the AR experience being provided by the AR device 201, but also during active consumption of the AR experience with the AR device 201.

As an example, the user 301 is able to view, on the television 202, a preview of a movie in which the motorcycle associated with the image 303 is present. Accordingly, the content system 200 illustrated in FIG. 2 may also generate supplemental content (e.g., video, audio, movies, previews, advertisements, product details for product purchase, product tutorials, etc.) that is associated with an image or sound in the AR experience; that supplemental content may then be displayed by the output device 202 during the AR experience.

Figure 4:
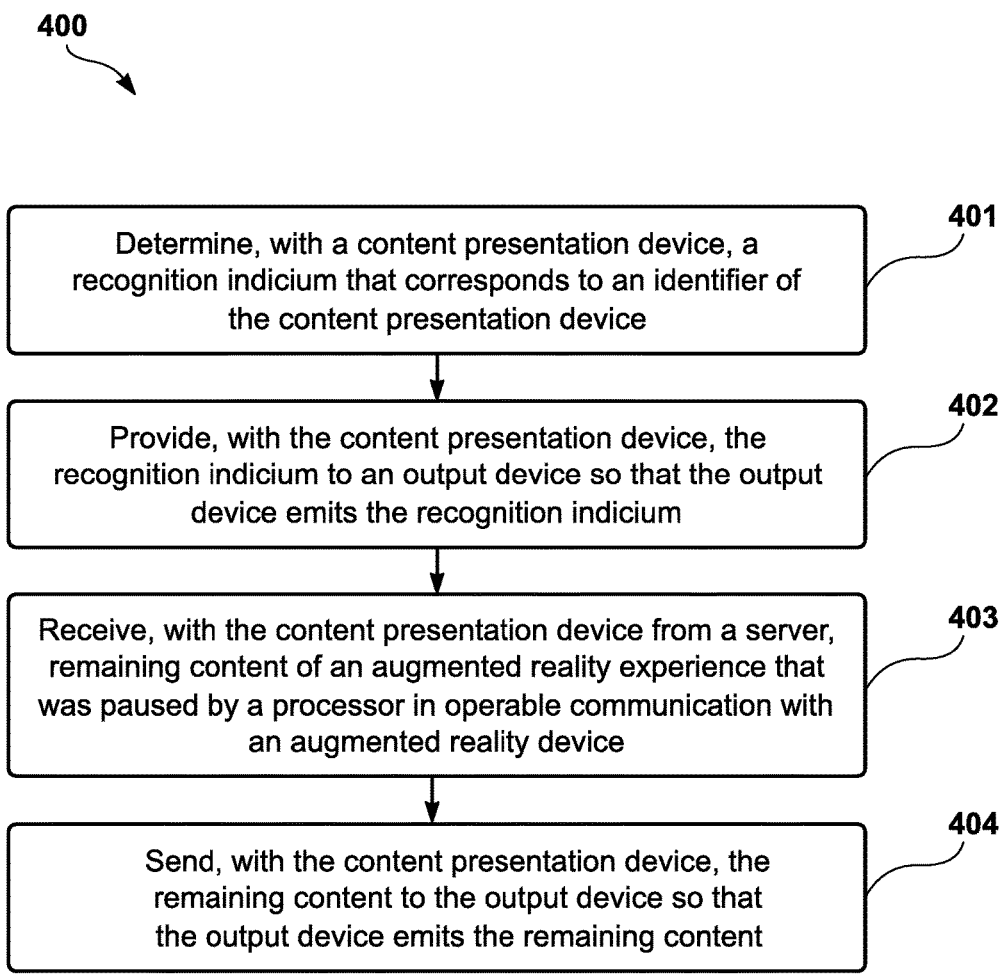
FIG. 4 illustrates a process executed by the content presentation device illustrated in FIGS. 1 and 2.

FIG. 4 illustrates a process 400 executed by the content presentation device 100 illustrated in FIGS. 1 and 2. At a process block 401, the process 400 determines, with the processor 101 (FIG. 1), the recognition indicium 302 (FIG. 3A) that corresponds to an identifier of the content presentation device 100 (FIG. 1). Further, at a process block 402, the process 400 provides, with the content presentation device 100, the recognition indicium to an output device 202 (FIG. 2) so that the output device 202 emits the recognition indicium 302. In addition, at the process block 403, the process 400 receives, with the content presentation device 100 from the server 205, remaining content of an AR experience that was paused by a processor in operable communication with an AR device 201. The AR device 201 is distinct from the output device 202. The AR device 201 sends, with the content presentation device 100, the remaining content to the output device 202 so that the output device emits the remaining content.

Figure 5:
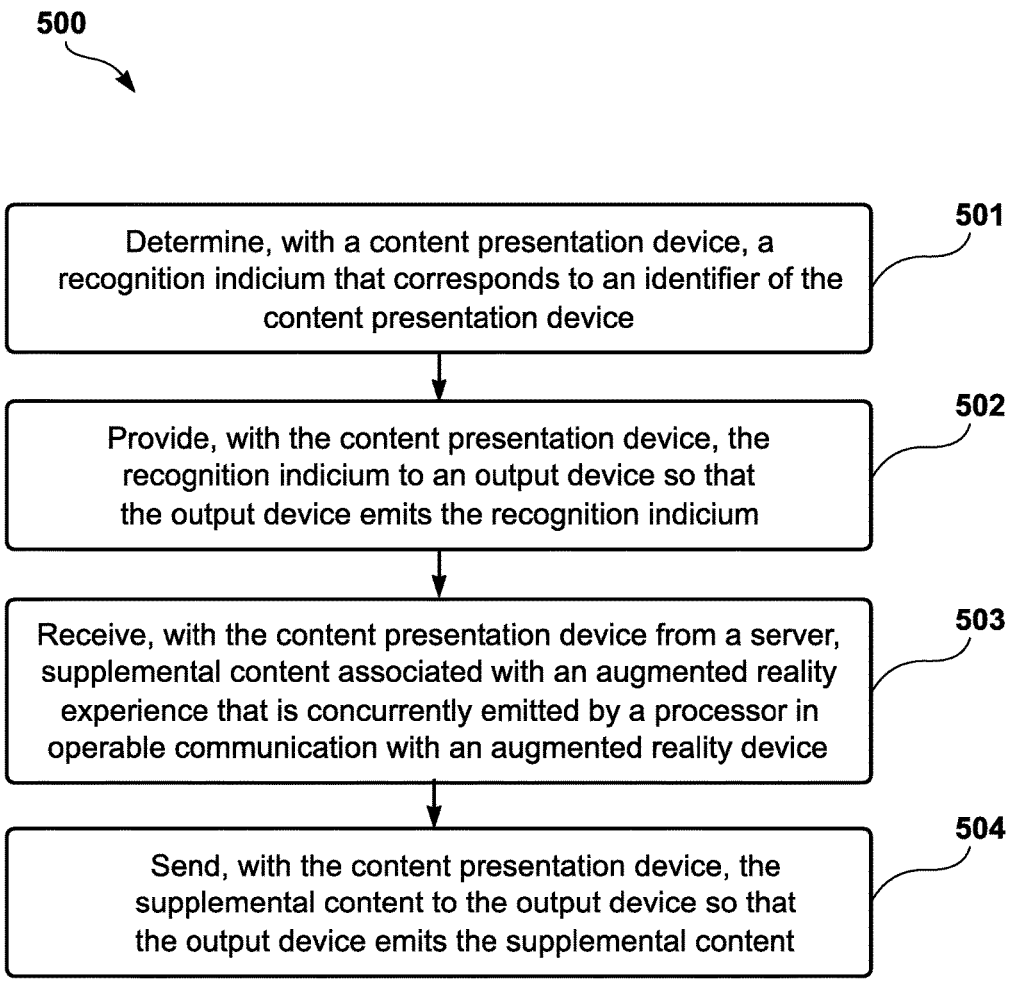
FIG. 5 illustrates another process executed by the content presentation device illustrated in FIGS. 1 and 2.

FIG. 5 illustrates another process 500 executed by the content presentation device 100 illustrated in FIGS. 1 and 2. At a process block 501, the process 500 determines, with the content presentation device 100, the recognition indicium 302 (FIG. 3A) that corresponds to an identifier of the content presentation device (FIG. 2). Further, at a process block 502, the process 500 provides, with the content presentation device 100, the recognition indicium 302 to an output device 202 so that the output device 202 emits the recognition indicium. In addition, at the process block 503, the process 500 receives, with the content presentation device 100 from a server 205, supplemental content associated with an AR experience that is concurrently emitted by a processor in operable communication with an AR device 201. The AR device 201 is distinct from the output device 202. The processor in operable communication with the AR device 201 sends the identifier and a request for the supplemental content to the server 205. At a process block 504, the process 500 sends, with the content presentation device 100, the supplemental content to the output device 202 so that the output device 202 emits the supplemental content.

The processes described herein may be implemented in a specialized processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium, e.g., computer readable storage device, capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a specialized, general, multi-purpose, or single purpose processor as described above. For example, a computer may be a desktop computer, laptop, smartphone, tablet device, set top box, etc.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer program product comprising a non-transitory computer readable storage device having a computer readable program stored thereon, wherein the computer readable program when executed on a computer causes the computer to:
   determine, with a content presentation device, a recognition indicium that corresponds to an identifier of the content presentation device;
   provide, with the content presentation device, the recognition indicium to an output device so that the output device emits the recognition indicium;
   receive, at the content presentation device from a server, remaining content of an augmented reality experience that was paused by a processor in operable communication with an augmented reality device, the augmented reality device being distinct from the output device, the processor sending the identifier and a position of the remaining content to the server; and
   send, with the content presentation device, the remaining content to the output device so that the output device emits the remaining content.

2. The computer program product of claim 1, wherein the computer is further caused to determine the recognition indicium by receiving the recognition indicium from the server.

3. The computer program product of claim 1, wherein the computer is further caused to determine the recognition indicium by generating, with the processor, the recognition indicium.

4. The computer program product of claim 1, wherein the recognition indicium is a coded pattern that comprises an internet protocol address of the content presentation device.

5. The computer program product of claim 1, wherein the augmented reality device pauses the augmented reality experience upon sensing, with a sensor, movement from a predetermined position.

6. The computer program product of claim 5, wherein the sensor is selected from the group consisting of an accelerometer and a gyroscope.

7. The computer program product of claim 1, wherein the augmented reality device is selected from the group consisting of: smart glasses, a tablet device, and a smartphone.

8. A computer program product comprising a non-transitory computer readable storage device having a computer readable program stored thereon, wherein the computer readable program when executed on a computer causes the computer to:
   determine, with a content presentation device, a recognition indicium that corresponds to an identifier of the content presentation device;
   provide, with the content presentation device, the recognition indicium to an output device so that the output device emits the recognition indicium;
   receive, at the content presentation device from a server, supplemental content associated with an augmented reality experience that is concurrently emitted by a processor in operable communication with an augmented reality device, the augmented reality device being distinct from the output device, the processor sending the identifier and a request for the supplemental content to the server; and
   send, with the content presentation device, the supplemental content to the output device so that the output device emits the supplemental content.

9. The computer program product of claim 8, wherein the supplemental content is selected from the group consisting of: movies, previous advertisements, and product offerings.

10. The computer program product of claim 8, wherein the computer is further caused to determine the recognition indicium by receiving the recognition indicium from the server.

11. The computer program product of claim 8, wherein the computer is further caused to determine the recognition indicium by generating, with the processor, the recognition indicium.

12. The computer program product of claim 8, wherein the recognition indicium is a coded pattern that comprises an internet protocol address of the content presentation device.

13. The computer program product of claim 8, wherein the augmented reality device pauses the augmented reality experience upon sensing, with a sensor, movement from a predetermined position.

14. The computer program product of claim 13, wherein the sensor is selected from the group consisting of an accelerometer and a gyroscope.

15. The computer program product of claim 8, wherein the augmented reality device is selected from the group consisting of: smart glasses, a tablet device, and a smartphone.

16. An apparatus comprising:
    a content presentation device that determines a recognition indicium that corresponds to an identifier of a content presentation device, provides the recognition indicium to an output device so that the output device emits the recognition indicium, receives, at the content presentation device from a server, remaining content of an augmented reality experience that was paused by a processor in operable communication with an augmented reality device, and sends the remaining content to the output device so that the output device emits the remaining content, the augmented reality device being distinct from the output device, the processor sending the identifier and a position of the remaining content to the server.

17. The apparatus of claim 16, wherein the recognition indicium is determined by receiving the recognition indicium from the server.

18. The apparatus of claim 16, wherein the recognition indicium is determined by generating, with the processor, the recognition indicium.

19. The apparatus of claim 16, wherein the recognition indicium is a coded pattern that comprises an internet protocol address of the content presentation device.

20. The apparatus of claim 16, wherein the augmented reality device pauses the augmented reality experience upon sensing, with a sensor, movement from a predetermined position.

* * * * *